(12) United States Patent
Saitou (10) Patent No.: US 9,313,472 B2
(45) Date of Patent: Apr. 12, 2016

(54) IMAGE CAPTURE APPARATUS THAT PHOTOGRAPHS A SPECIFIC SUBJECT, A COMMUNICATION METHOD, A STORAGE MEDIUM AND A COMMUNICATION SYSTEM

(71) Applicant: CASIO COMPUTER CO., LTD., Shibuya-ku, Tokyo (JP)

(72) Inventor: Kouichi Saitou, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 138 days.

(21) Appl. No.: 14/191,083

(22) Filed: Feb. 26, 2014

(65) Prior Publication Data

US 2014/0285679 A1 Sep. 25, 2014

(30) Foreign Application Priority Data

Mar. 21, 2013 (JP) .................. 2013-059040

(51) Int. Cl.
*H04N 9/82* (2006.01)
*H04N 1/00* (2006.01)
(Continued)

(52) U.S. Cl.
CPC ......... *H04N 9/8227* (2013.01); *H04N 1/00336* (2013.01); *H04N 1/32117* (2013.01); *H04N 5/765* (2013.01); *H04N 5/772* (2013.01); *H04N 9/8205* (2013.01); *H04N 2201/3205* (2013.01)

(58) Field of Classification Search
CPC . H04N 9/8227; H04N 1/00336; H04N 5/772; H04N 9/8205; H04N 1/32117; H04N 5/765; H04N 2201/3205

USPC ........ 348/14.01, 211.1, 231.9, E7.07, E7.081
See application file for complete search history.

(56) References Cited

U.S. PATENT DOCUMENTS 7,479,987 B2 *  1/2009  Watanabe .......... H04N 1/00137
                                                    348/207.1
7,714,911 B2    5/2010  Yoshida
(Continued)

FOREIGN PATENT DOCUMENTS

JP  2005057560 A    3/2005
JP  2008-092174 A   4/2008
(Continued)

OTHER PUBLICATIONS

Korean Office Action (and English translation thereof) dated Jun. 5, 2015, issued in counterpart Korean Application No. 10-2014-0029477.
(Continued)

*Primary Examiner* — Hung Lam
(74) *Attorney, Agent, or Firm* — Holtz, Holtz & Volek PC (57) ABSTRACT

An image capture apparatus includes a second communication control unit, a first communication control unit and a communication unit. The second communication control unit controls the communication unit so as to transmit information of a face image serving as identification information to identify a specific subject to one other image capture apparatus. The first communication control unit controls the communication unit so as to receive from the other image capture apparatus, from among images captured by the image capture unit included in each image capture apparatus, an image in which a subject designated by the transmitted face image is captured.

14 Claims, 6 Drawing Sheets

(51) Int. Cl.
*H04N 1/32* (2006.01)
*H04N 5/765* (2006.01)
*H04N 5/77* (2006.01)

(56) References Cited

U.S. PATENT DOCUMENTS

| | | | | |
|---|---|---|---|---|
| 2002/0049728 A1* | 4/2002 | Kaku | ............... | G06F 17/30259 |
| 2004/0059499 A1* | 3/2004 | Rudd | ............... | H04L 29/06 |
| | | | | 701/408 |
| 2007/0283031 A1* | 12/2007 | Yoshida | ............. | H04N 1/00148 |
| | | | | 709/230 |
| 2009/0091637 A1 | 4/2009 | Suzuki | | |
| 2014/0267546 A1* | 9/2014 | Kwon | ............... | H04N 7/142 |
| | | | | 348/14.02 |

FOREIGN PATENT DOCUMENTS

| | | | | |
|---|---|---|---|---|
| JP | 2009-94574 A | | 4/2009 | |
| JP | 2012050011 A | | 3/2012 | |
| JP | 2012-050011 | * | 8/2012 | ............ H04N 5/225 |
| JP | 2012-235282 A | | 11/2012 | |
| KR | 1020070115651 A | | 12/2007 | |

OTHER PUBLICATIONS

Japanese Office Action dated Nov. 25, 2014, issued in counterpart Japanese Application No. 2013-059040.

* cited by examiner

| FACE IMAGE | APPARATUS |
|---|---|
| A | OWN APPARATUS |
| B | OWN APPARATUS |
| C | OWN APPARATUS |
| D | APPARATUS A |
| E | APPARATUS A |
| F | APPARATUS B |
| G | APPARATUS C |
| H | APPARATUS C |
| I | APPARATUS C |
| ⋮ | ⋮ |

FIG.6A

| FACE IMAGE | IMAGE TYPE | PRIORITY FLAG |
|---|---|---|
| A | MOVING IMAGE | 2 |
| B | STILL IMAGE | 0 |
| C | CONTINUOUS SHOOTING IMAGE | 1 |
| ⋮ | ⋮ | ⋮ |

FIG.6B

| VALUE | PRIORITY FLAG |
|---|---|
| 0 | PRIORITIZING OWN CAMERA |
| 1 | PRIORITIZING CAMERA FOR WHICH PERSON AREA IN SPECIFIC FACE RECOGNITION IS LARGE |
| 2 | COMBINING PLURALITY OF DATA SETS |

FIG.7

IMAGE CAPTURE APPARATUS THAT PHOTOGRAPHS A SPECIFIC SUBJECT, A COMMUNICATION METHOD, A STORAGE MEDIUM AND A COMMUNICATION SYSTEM

This application is based on and claims the benefit of priority from Japanese Patent Application No. 2013-059040, filed on 21 Mar. 2013, the content of which is incorporated herein by reference.

BACKGROUND OF THE INVENTION

1. Field of the Invention

The present invention relates to an image capture apparatus, communication method, storage medium and communication system.

2. Related Art

Conventionally, a technology has been known that detects the face of a person from an image photographed in an image capture apparatus. For example, Japanese Unexamined Patent Application, Publication No. 2008-92174 discloses a technology that enables storing in high resolution only an image required for a photographer among images in which the face of a person specified is photographed from among a plurality of images

SUMMARY OF THE INVENTION

According to a first aspect of the present invention, an image capture apparatus includes:

a transmission control section that transmits identification information for identifying a specific subject to one other apparatus; and a reception control section that receives, from among images photographed by an image capture section included in the other apparatus, an image in which a subject designated by identification information transmitted by the transmission control section is photographed by the other apparatus having received the identification information, and is transmitted to an own apparatus address.

According to a second aspect of the present invention, an image capture apparatus includes:

a reception control section that receives identification information of a subject designated by one other apparatus; and a transmission control section that transmits, from among images captured by an image capture section included in an own apparatus, an image in which a subject designated by identification information of a subject received by the reception control section is captured, to the other apparatus having transmitted identification information in which the subject is designated.

According to a third aspect of the present invention, a communication method includes the steps of:

transmitting identification information that identifies a specific subject to one other apparatus; and receiving, from among images captured by an image capture section included in the other apparatus, an image in which a subject designated by the identification information transmitted in the step of transmitting is captured by the other apparatus having received the identification information, and transmitted to an own apparatus address.

According to a fourth aspect of the present invention, a computer-readable non-transitory storage medium is encoded with a program enabling a computer that controls an image capture apparatus to execute:

a transmission control function of transmitting identification information that identifies a specific subject to one other apparatus; and a reception control function of receiving, from among images captured by an image capture section included in the other apparatus, an image in which a subject designated by the identification information transmitted by way of the transmission control function is captured by the other apparatus having received the identification information, and transmitted to an own apparatus address.

According to a fifth aspect of the present invention, a communication system transmits and receives an image between a plurality of image capture apparatuses, in which an image capture apparatus includes: a first transmission control section that transmits identification information of a subject designated to one other apparatus, and a first reception control section that receives, from among images captured by an image capture section included in the other apparatus, an image in which the subject designated by the identification information transmitted by the first transmission control section is captured by the other apparatus having received the identification information, and is transmitted to an own apparatus address; and in which the other image capture apparatus includes: a second reception control section that receives identification information of a subject transmitted by the first transmission control section, and a second transmission control section that transmits, from among images captured by an image capture section included in an own apparatus, an image in which the subject designated by the identification information received by the first reception control section is captured, to the other apparatus having transmitted the identification information in which the subject is designated.

According to a sixth aspect of the present invention, a communication method executed by an image capture apparatus, includes the steps of:

receiving identification information of a subject designated by one other apparatus; and transmitting, from among images captured by an image capture section included in an own apparatus, an image in which the subject designated by the identification information received in the step of receiving is captured, to the other apparatus having transmitted identification information in which the subject is designated.

According to a seventh aspect of the present invention, a computer-readable non-transitory storage medium is encoded with a program enabling a computer that controls an image capture apparatus to execute:

a reception control function of receiving identification information of a subject designated by one other apparatus; and a transmission control function of transmitting, from among images captured by an image capture section included in an own apparatus, an image in which the subject designated by the identification information received by way of the reception control function is captured, to the other apparatus having transmitted identification information in which the subject is designated.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE INVENTION

Hereinafter, embodiments of the present invention will be explained while referencing the drawings.

Figure 1:
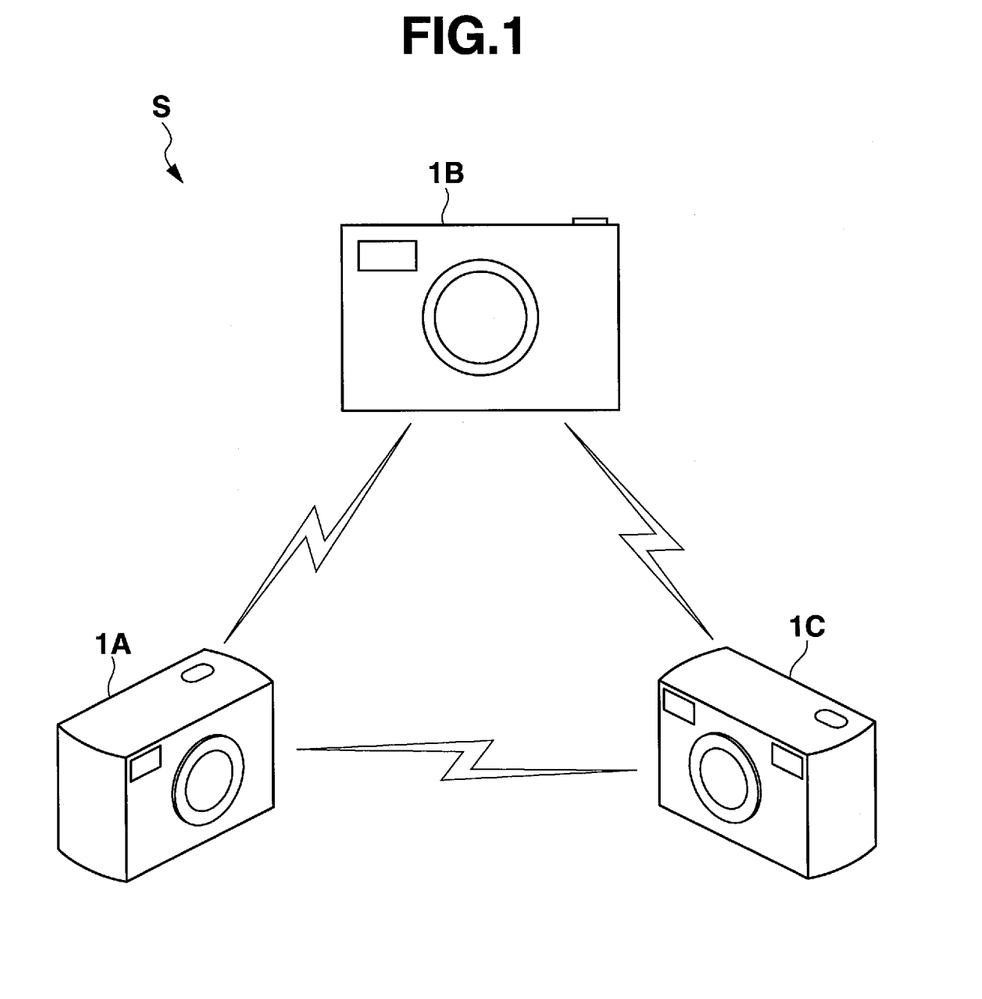
FIG. 1 is a system configuration drawing showing the system configuration of a communication system according to an embodiment of the present invention.

FIG. 1 is a system configuration diagram showing the system configuration of a communication system S according to an embodiment of the present invention.

The communication system S of the present embodiment is configured from a plurality of image capture apparatuses 1A, 1B and 1C as shown in FIG. 1.

It should be noted that each of the image capture apparatuses 1A, 1B and 1C, in cases not requiring individually distinguishing, will be collectively referred to as "image capture apparatuses 1".

Each of the image capture apparatuses 1 transmits and receives photographed images and images stored in memory, etc. between mutually certified apparatuses, indirectly via a network such as LAN (Local Area Network), or by direct communication without a server as in communication by Bluetooth (registered trademark) or infrared communication.

Each of such image capture apparatuses 1 is configured so as to transmit and receive only images for which acquisition is desired in any of the image capture apparatuses 1. In other words, the image capture apparatus 1 transmits an image to the image capture apparatuses 1A to 1C desiring acquisition, if an image retained in the own apparatus is an image for which acquisition is desired by any of the image capture apparatuses 1A to 1C. On the other hand, the image capture apparatus 1 to which the image is transmitted receives this image, or performs judgment as to whether to store the received image, determines the propriety of acquisition, and acquires the image.

Herein, in addition to transmitting a photographed image to one other image capture apparatus, transmitting a photographed image to the own apparatus is also included as the destination of the image.

In the communication system S performing transmission and reception of such images, the presence of an acquisition request is shared by all of the image capture apparatuses 1 in units of an image. Each of the image capture apparatuses 1 transmits and receives an image obtained in an image capture apparatus 1 requesting acquisition, based on information that is shared upon obtaining an image.

For this reason, identification information for identifying an image for which acquisition is requested is acquired in advance in the image capture apparatus 1. The image capture apparatus 1 specifies an image capture apparatus 1 requesting acquisition based on the identification information when an image is obtained, and transmits the image to the image capture apparatus 1 thus specified.

By configuring the image capture apparatuses 1 in this way, the communication system S has a function of enabling an image capture apparatus 1 to acquire an image for which acquisition is requested by any of the image capture apparatuses 1 in the communication system S, in either case among a case of being obtained by the own apparatus, or a case of being obtained by the other image capture apparatuses 1, and enabling all of the image capture apparatuses 1 to acquire a more appropriate image of a subject.

Next, an operation example of the communication system S having such a function will be explained.

FIG. 2 is a view showing an operation example of the communication system of the present embodiment.

Figure 2A:
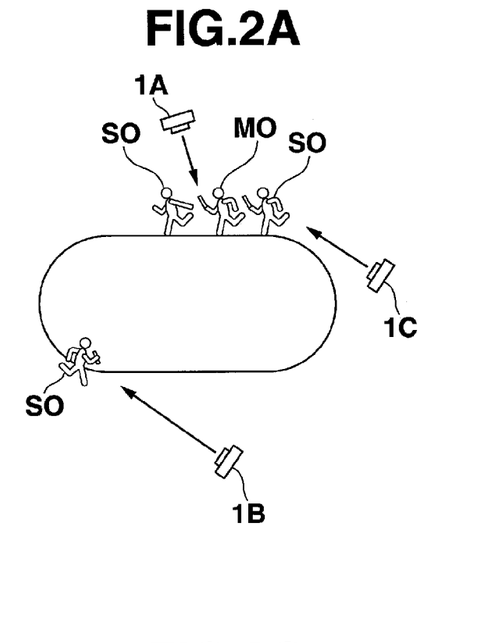
FIGS. 2A, 2B, 2C and 2D are drawings showing operation examples of the communication system of the present embodiment.

The communication system S of the present embodiment can operate, as shown in FIG. 2A, between image capture apparatuses 1A to 1C used by parents, etc. viewing an athletic event, for example.

At the athletic event, the parents, etc. doing the viewing from bleachers provided at the periphery of the grounds, centering on the grounds on which a program or match is conducted. The parents, etc. photograph a scene at the athletic even including their children with the image capture apparatuses 1A to 1C owned by each.

For example, when photographing a relay event, if not photographing a scene like running towards the side of the image capture apparatus 1 due to the relationship of arrangement of bleachers, it will not be possible to acquire a satisfactory image in which the face of a child is imaged to be large.

However, in the present communication system S, by setting identification information capable of specifying a subject that is the aim of a photographer possessing the image capture apparatus 1, even if an image photographed by any of the image capture apparatuses 1A to 1C, this identification information is shared with other image capture apparatuses 1, and in the case of an image including the subject that is the aim set in any of the image capture apparatuses 1 having been obtained in an image photographed in any of the image capture apparatuses 1, it is possible to transmit to the image capture apparatus 1 requesting the image including the subject that is the aim, thereby enabling acquisition thereof.

Figure 2B:
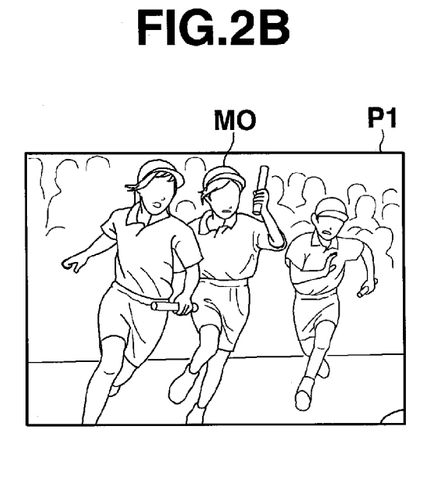

More specifically, in a case of there being a setting of requesting acquisition of an image in which a subject MO is included by the image capture apparatus 1B, the image including the subject MO is transmitted from the image capture apparatus 1A to the image capture apparatus 1B, when an image P1 including the subject MO as in FIG. 2B is photographed by the image capture apparatus 1A.

In the image capture apparatus 1 having received the image P1 including the subject MO, a judgment as to whether an image is desired for acquisition upon reception is done, and is stored if a corresponding image, whereby an image for which acquisition is requested from among images photographed by the image capture apparatuses 1 is acquired under the communication system S. In other words, in the communication system S, images photographed by each of the image capture apparatuses 1 can be shared according to the settings of each of the image capture apparatuses 1.

So long as users of the image capture apparatuses 1 utilizing the communication system S are performing photography so that subjects are favorably portrayed, without concern about the attributes of the subject, aside from the presence of their own desire, it is possible to acquire from the other image capture apparatus 1 an image in which a subject of their own desire is suitably portrayed.

If operated in this way, each parent can acquire an image in which a child that is the subject serving as the aim is portrayed. In addition, in the case of there being an image capture apparatus 1 owned by a parent that is not attending and happens to be present at this place, by setting as an image capture apparatus 1 under the communication system S, it is possible to establish as a transmission target of images, and an image for which acquisition is requested can be acquired via a network, etc.

Figure 2C:
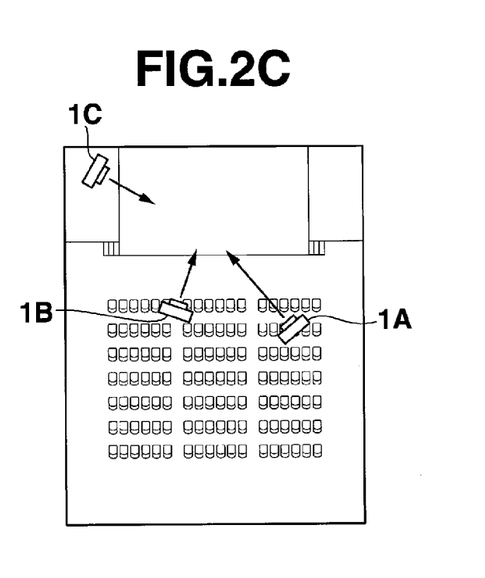

In addition, as another operational example, the communication system S of the present embodiment can operate with the image capture apparatuses 1A to 1C used by staff members capturing video of sports, etc., as shown in FIG. 2C. Even if an image following a location as mentioned above can be acquired, the image capture apparatuses 1A to 1C arranged at each place cannot acquire an image portraying only a desired subject. However, in the present communication system S, a desired image set by a predetermined image acquisition apparatus 1 can be acquired, even while performing photography following locations with each of the image capture apparatuses 1A to 1C.

Figure 2D:
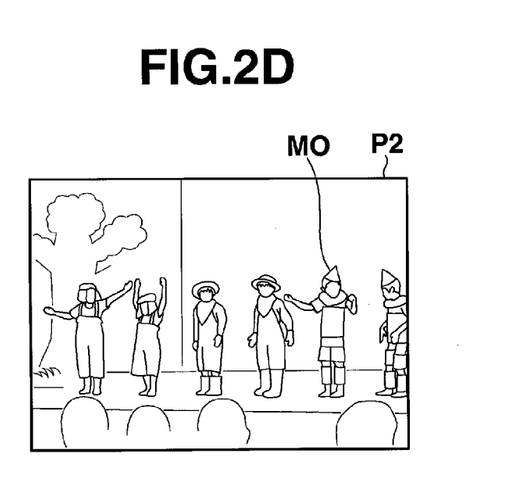

More specifically, in the case of there being a setting for requesting an image in which a predetermined subject is included by the image capture apparatus 1C, an image P2 including the subject MO is transmitted from the image capture apparatus 1A to the image capture apparatus 1C when the image including the subject MO made a setting by the image capture apparatus 1A is photographed as shown in FIG. 2D. The image P2 including the subject MO can thereby be acquired in the image capture apparatus 1C. In addition, in a case of a staff member generating an image collection collecting only a specific subject for a spectator, for example, if images acquired by the image capture apparatus 1C are collected, a predetermined image collection can be generated simply. In addition, since it is unnecessary to perform sorting of images, for example, it is possible to compile and display an end roll, etc. immediately after photography. In other words, it is no longer necessary to confirm every image and perform sorting of images, and thus the work load of compiling decreases, as well as being able to exhibit the secondary effect of real-time compilation becoming possible.

The image capture apparatus 1 having the aforementioned such function will be explained.

Figure 3:
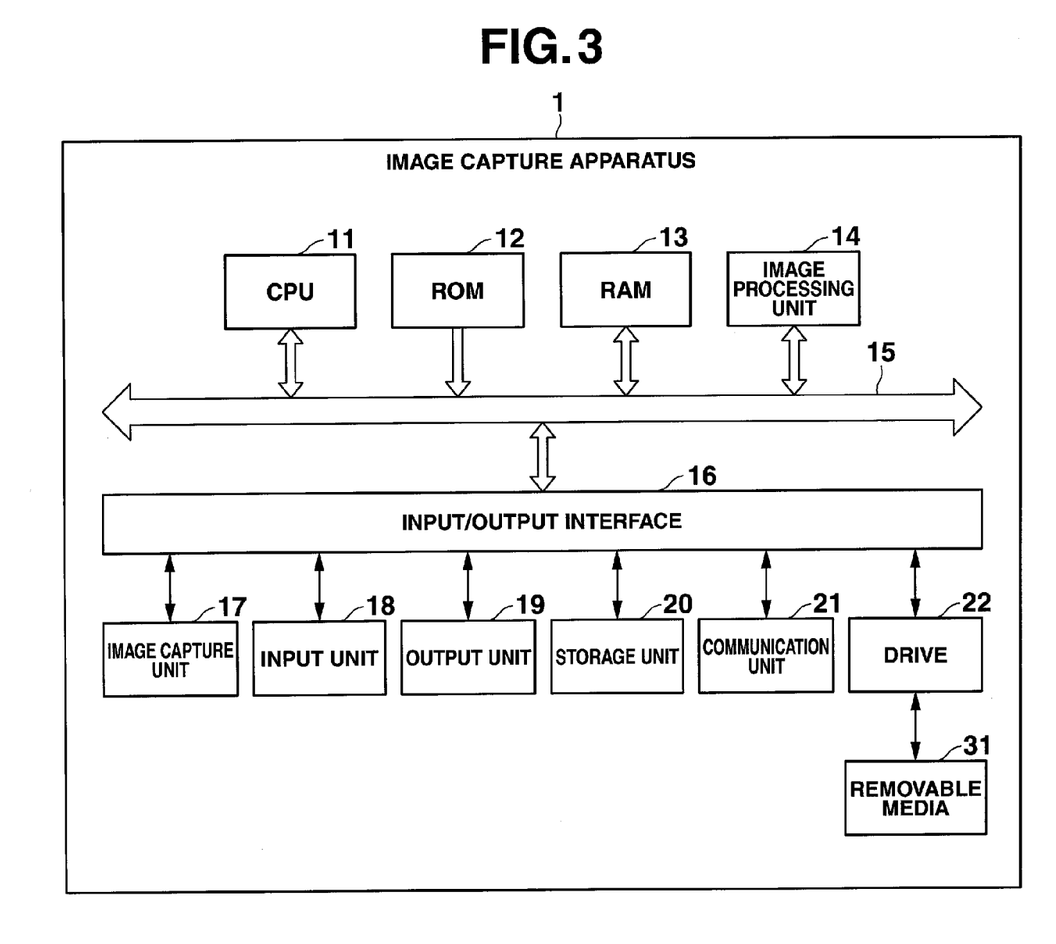
FIG. 3 is a block diagram showing the configuration of hardware of an image capture apparatus according to an embodiment of the present invention.

FIG. 3 is a block diagram showing the configuration of hardware of the image capture apparatus 1 according to one embodiment of the present invention.

The image capture apparatus 1 is configured as a digital camera, for example.

The image capture apparatus 1 is provided with a CPU (Central Processing Unit) 11, ROM (Read Only Memory) 12, RAM (Random Access Memory) 13, image processing unit 14, bus 15, input/output interface 16, image capture unit 17, input unit 18, output unit 19, storage unit 20, communication unit 21, and drive 22.

The CPU 11 executes various processing in accordance with programs stored in the ROM 12, or programs loaded from the storage unit 20 to the RAM 13.

As appropriate, the RAM 13 stores data, etc. required upon the CPU 11 executing various processing.

The CPU 11, ROM 12, RAM 13 and image processing unit 14 are connected with each other via the bus 15. In addition, the input/output interface 16 is also connected to this bus 15.

The image capture unit 17, input unit 18, output unit 19, storage unit 20, communication unit 21 and drive 22 are connected to the input/output interface 16.

Although not illustrated, the image capture unit 17 is provided with an optical lens unit and image sensor.

The optical lens unit is configured by lenses that collect light, e.g., focus lens, zoom lens, etc., in order to photograph a subject.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog image signal. The variety of signal processing generates a digital signal that is output as an output signal from the image capture unit 17.

Such an output signal of the image capture unit 17 is hereinafter referred to as "captured image data". The captured image data is supplied as appropriate to the CPU 11, etc.

The input unit 18 is configured by various buttons and the like, and inputs various information in response to an instructional operation of the user.

The output unit 19 is configured by a display, speaker and the like, and outputs images and sound.

The storage unit 20 is configured from a hard disk, DRAM (Dynamic Random Access Memory) or the like, and stores the data of various images.

The communication unit 21 controls communication performed with another apparatus (not illustrated) via a network including the internet.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 20, as necessary. Similarly to the storage unit 20, the removable medium 31 can also store a variety of data such as the image data stored in the storage unit 20.

Figure 4:
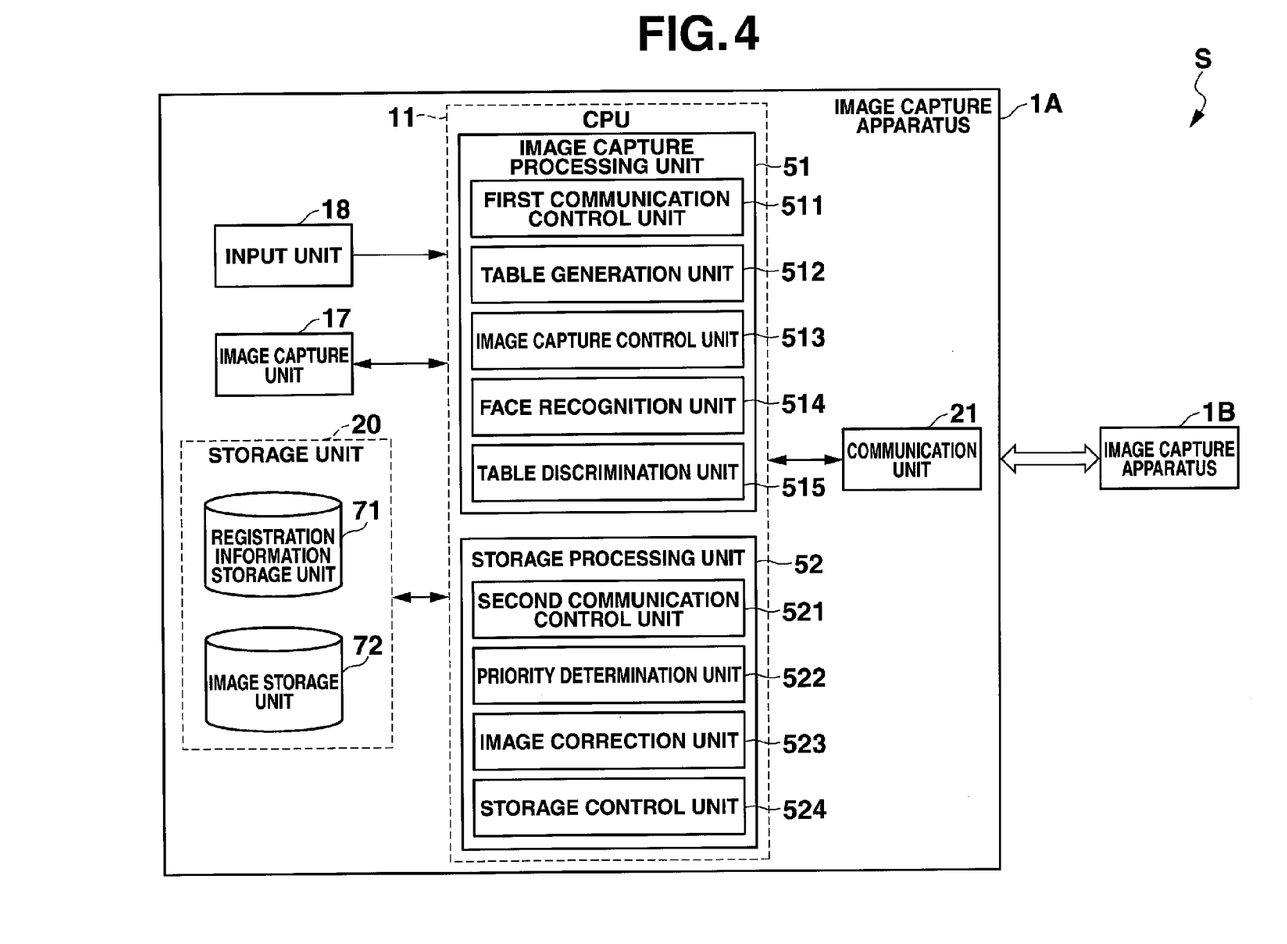
FIG. 4 is a functional block diagram showing a functional configuration for executing image capture processing and storing processing among the functional configurations of the image capture apparatus of FIG. 3.

Among the functional configurations of such an image capture apparatus 1, FIG. 4 is a functional block diagram showing the functional configuration for executing image capture processing and storing processing.

It should be noted that the image capture processing and storing processing will be explained with the own apparatus defined as the image capture apparatus 1A, the other apparatus defined as the image capture apparatus 1B in the communication system S, and the respective processing being executed in the image capture apparatus 1A.

First, the functional configuration for executing image capture processing will be explained.

Herein, "image capture processing" refers to a series of processing of acquiring registration data in each image capture apparatus and generating table data, then initiating photography, and in the case of the contents of registration data being included in a photographed image, transmitting the photographed image to the other image capture apparatus. This image capture processing is executed by an image capture processing unit 51 of the CPU 11.

When executing image capture processing, a first communication control unit 511, table generation unit 512, image capture control unit 513, face detection unit 514, and table discrimination unit 515 function in the image capture processing unit 51 of the CPU 11.

It should be noted that, each function of the first communication control unit 511, table generation unit 512, image capture control unit 513, face detection unit 514, and table discrimination unit 515 as mentioned above are not particularly required to be built into the CPU 11 as in the present embodiment, and at least a part of these respective functions can be assigned to the image processing unit 14.

A registration information storage unit 71 is provided in an area of the storage unit 20.

Various registration information such as a registration data table and a priority setting table described later is stored in the registration information storage unit 71.

Figure 5:
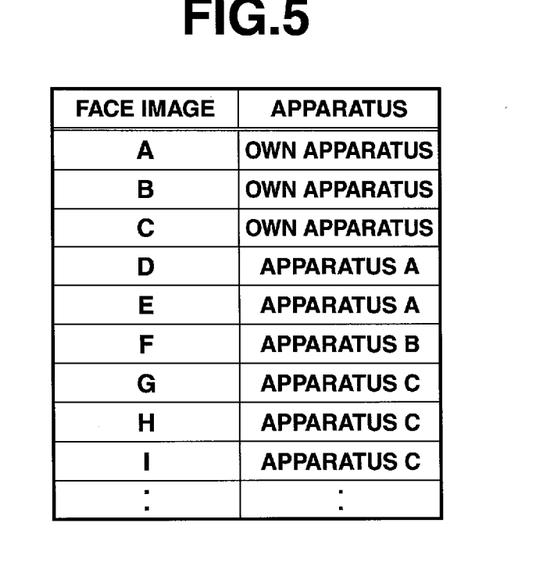
FIG. 5 is a table showing registration data stored in a registration information storage unit.

FIG. 5 shows a registration data table.

"Registration data table" is a table written for destinations of images when an image in which a corresponding face image is included has been photographed. The registration data table is generated based on registration data indicating the presence of a demand for an image including a face image transmitted from the other apparatus set in the own apparatus. The registration data is generated from information indicating the presence of reception of a face image in the priority setting table stored in advance in each apparatus. The details of the priority setting table will be described later.

In the example of the registration data table of FIG. 5, the "apparatus" that is the destination is associated with a "face image".

More specifically, the registration data table is associated so as to transmit an image to "apparatus: own apparatus" in the case of an image including "face image: A" being photographed, as shown in FIG. 5.

It should be noted that, although one image capture apparatus is associated with one face image in the example of FIG. 5, it is also possible to set so as to associate a plurality of image capture apparatuses with one face image.

Referring back to FIG. 4, the first communication control unit 511 controls transmission and reception of data in a communication unit 21. More specifically, the first communication control unit 511 controls the communication unit 21 so as to make a transmission request of registration data, receive transmitted registration data, transmit together a notice of the fact that an image in which a set face is portrayed has been photographed and an image that is discrimination material to the set other image capture apparatus 1B, receive a transmission request of a captured image from the other image capture apparatus 1B, and transmit the captured image to the other image capture apparatus 1B having transmitted the transmission request for the captured image.

The table generation unit 512 generates a registration data table based on the registration data transmitted from the other image capture apparatus 1B and the registration data generated from the priority setting table set in the own apparatus. More specifically, the table generation unit 512 generates a table in which a face image and a destination apparatus are associated as shown in FIG. 5, for example.

The image capture control unit 513 detects a pressing operation on a shutter button of the input unit 18, and controls the image capture unit 17 so as to and perform image capture processing.

The face detection unit 514 detects a face within an image by analyzing an image outputted from the image capture unit 17.

The table discrimination unit 515 references the registration data table to discriminate between the results of face detection and the registration data. In other words, the table discrimination unit 515 matches a face image registered in the registration data table as shown in FIG. 5 and the results of face detection, and discriminates whether it is an image including a registered face image.

Next, the functional configuration for executing storing processing will be explained.

Herein, "storing processing" is a series of processing from performing discrimination of images photographed by the other image capture apparatus or own apparatus, until storing only the image for which storing is permitted from the discrimination result. This storing processing is executed by the storage processing unit 52 of the CPU 11.

When executing storing processing, a second communication control unit 521, priority determination unit 522, image correction unit 523 and storage control unit 524 function in the storage processing unit 52 of the CPU 11.

It should be noted that each of the functions of the second communication control unit 521, priority determination unit 522, image correction unit 523 and storage control unit 524 as mentioned above are not particularly required to be built into the CPU 11 as in the present embodiment, and at least a part of these respective functions can be assigned to the image processing unit 14.

The registration information storage unit 71 and image storage unit 72 are provided in an area of the storage unit 20.

Various registration information such as the aforementioned registration data table and a priority setting table is stored in the registration information storage unit 71.

Figure 6A:
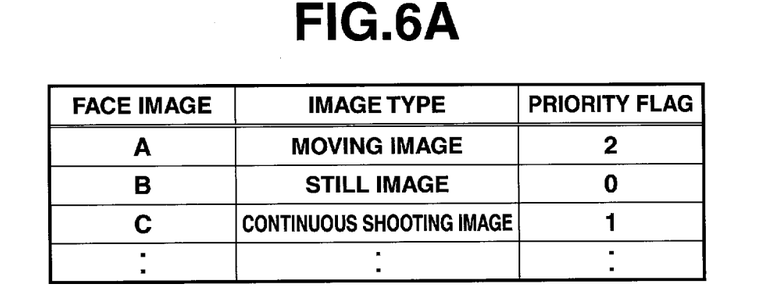
FIGS. 6A and 6B are tables showing priority setting tables indicating the degree of priority of reception of images.
Figure 6B:
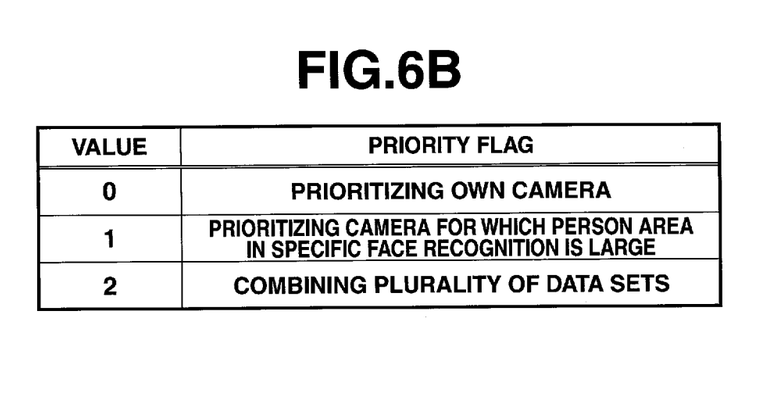

FIG. 6 shows a priority setting table indicating the degree of priority of reception of images.

Herein, "priority setting table" is a table used for discriminating whether to store an image photographed by the other image capture apparatus or own apparatus. In regards to storing, this priority setting table not only simply stores, but also enables setting of processing such as joining a plurality of data sets and storing.

The priority setting table decides what kind of storing to perform on a recognized face image, as shown in FIG. 6A. In addition, "image type" can be set as moving image, still image, continuous shooting, etc.

For a combination of "face image" and "image type", the processing of storing is determined according to the "priority flag".

Regarding the "priority flag", the value of "0" sets "prioritize own camera", and indicates not to store an image from the other image capture apparatus, as shown in FIG. 6B. A value of "1" states "prioritize camera having large area of person of specified face recognition", and indicates to store an image having a large area of the face recognized subject, among the images received from the other image capture apparatus and own apparatus. A value of "2" states "combine plurality of data sets", and indicates to combine and store all of the images received from the other image capture apparatus or own apparatus.

Therefore, in the example of FIG. 6A, the "face image: A" is handled with storing of "combine plurality of data sets" with the image of "image type: moving image" as "priority flag: 2".

In addition, the "face image: B" is handled with storing of "prioritize own camera" with the image of "image type: still image" as "priority flag: 0".

In addition, the "face image: C" is handled with storing of "specific face recognition" with the image of "image type: continuous shooting" as "priority flag: 1".

Referring back to FIG. 4, data of a received image is stored in the image storage unit 72.

The second communication control unit 521 controls the communication unit 21 so as to transmit and receive data relating to storing processing such as notification and images. More specifically, the second communication control unit 521 controls the communication unit 21 so as to receive a demand of the matter of demanding to transmit registration data, transmit registration data stored in the registration information storage unit 71 to the image capture apparatus having performed the transmission request for registration data, receive notification to a specified apparatus transmitted together with an image serving as discrimination material, and perform a demand to transmit a photographed image.

The priority determination unit 522 discriminates whether reception is necessary from the discrimination results of priority. More specifically, the priority determination unit 522 references the priority setting table as shown in FIG. 6A to discriminate the priority corresponding to the image.

The image correction unit 523 performs adjustment of a moving image so that a sense of incongruity in the joining images is not imparted, as correction of image quality of the joining portion of each moving image. More specifically, in addition to color correction and correction such as to achieve uniformity in white balance, for example, the image correction unit 523 also performs correction such as to unify volume. It should be noted that correction of an image in the image correction unit 523 is performed employing existing image correction technology.

The storage control unit 524 controls the image storage unit 72 so as to store an image for which it is determined that reception is necessary according to the priority determination unit 522.

Next, the flows of image capture processing and storing processing executed by the image capture apparatus having the aforementioned such functional configuration will be explained.

Figure 7:
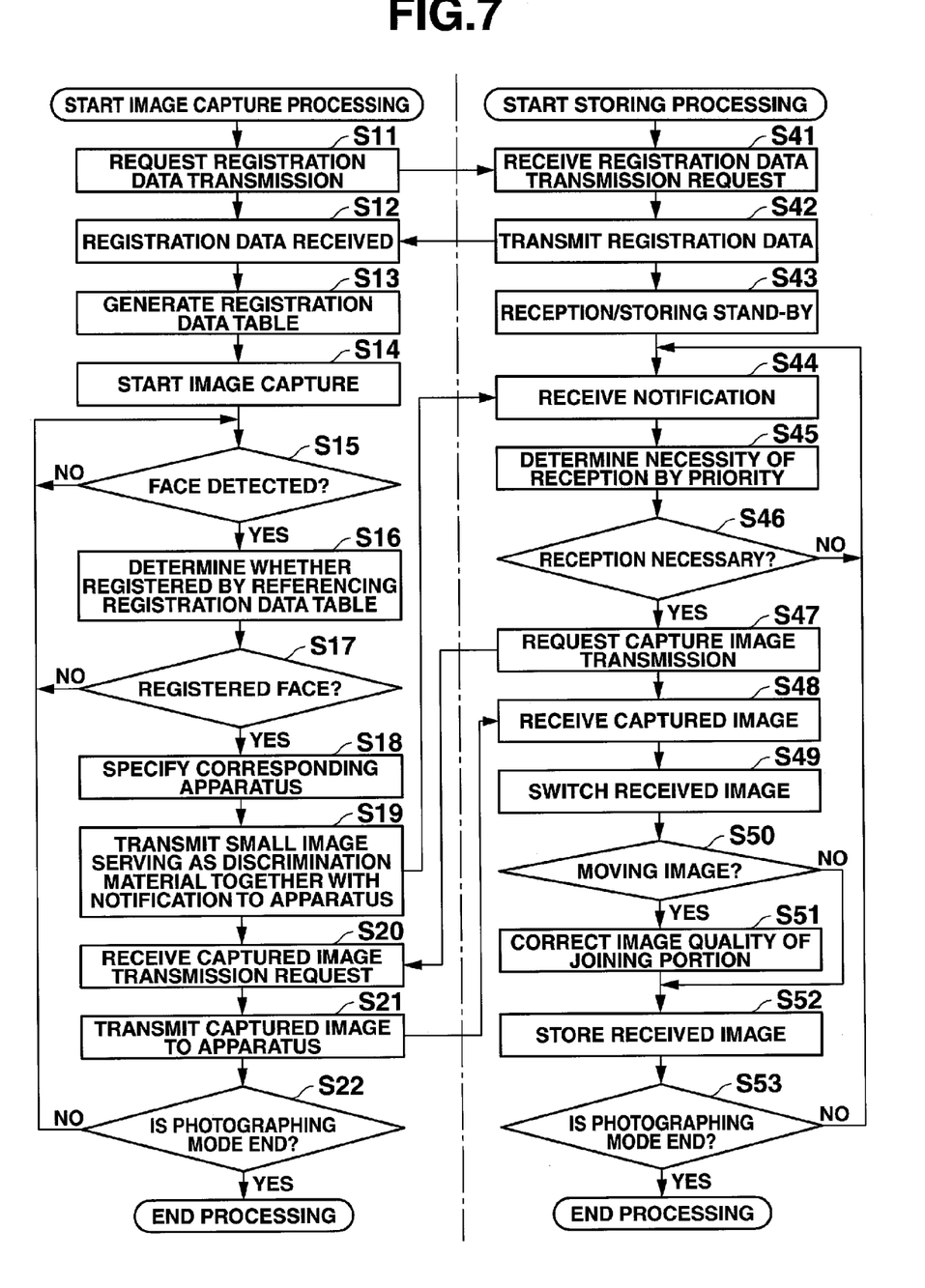
FIG. 7 is a flowchart illustrating the flow of image capture processing and storing processing executed by the image capture apparatus of FIG. 3 having the functional configuration of FIG. 4.

FIG. 7 is a flowchart illustrating the flows of image capture processing and storing processing executed by the image capture apparatus of FIG. 3 having the functional configuration of FIG. 4.

First, for the flows of processing, the detailed flow of image capture processing will be explained.

First, the image capture processing is initiated on the event of a start operation of image capture processing having been made on the input unit 18 by a user.

In Step S11, the communication unit 21 performs a transmission request for registration data. In other words, the first communication control unit 511 controls the communication unit 21 so as to perform a demand to transmit registration data to each image capture apparatus.

In Step S12, the communication unit 21 makes reception of registration data. In other words, the first communication control unit 511 controls the communication unit 21 so as to receive registration data sent from the other image capture apparatus 1B in relation to the transmission request for registration data.

In Step S13, the table generation unit 512 generates a registration data table from the received registration data. The table generation unit 512 outputs the generated registration data table to the registration information storage unit 71.

In Step S14, the image capture unit 17 initiates image capture processing. The image capture control unit 513 detects a pressing operation on the shutter button, and controls the image capture unit 17 so as to initiate image capture processing. As a result of image capture processing, the image capture unit 17 outputs a captured image.

In Step S15, the face detection unit 514 determines whether a face has been detected.

In the case of a face not being detected, it is determined as NO in Step S15, and this processing is executed until a face is determined.

In the case of a face being detected, it is determined as YES in Step S15, and the processing advances to Step S16.

In Step S16, the table discrimination unit 515 refers to the registration data table to discriminate between the face detection results and the registered face images.

In Step S17, the table discrimination unit 515 discriminates whether the determination result is registered as a face image.

In the case that the face detection result is not registered as a face image, it is determined as NO in Step S17, and the processing returns to Step S15.

In the case that the face detected result is registered as a face image, it is determined as YES in Step S17, and the processing advances to Step S18.

In Step S18, the table discrimination unit 515 specifies an apparatus in which a registered face is set from the referenced registration data table.

In Step S19, the communication unit 21 transmits a notification to a specified apparatus together with an image serving as discrimination material. In other words, the first communication control unit 511 controls the communication unit 21 so as to transmit a notification that an image in which a set face is portrayed has been photographed together with an image having low communication load serving as discrimination material to a specified apparatus.

In Step S20, the communication unit 21 receives a transmission request for a photographed image. In other words, the first communication control unit 511 controls the communication unit 21 so as to receive a demand that transmitting a photographed image is desired, as a result of judging the notification and image transmitted in Step S19.

In Step S21, the communication unit 21 transmits a photographed image to a corresponding apparatus. In other words, the first communication control unit 511 controls the communication unit 21 so as to transmit a photographed image to an apparatus having transmitted a transmission request for the photographed image.

In Step S22, the CPU 11 determines whether the photographing mode has ended.

In the case of the photographing mode not ending, it is determined as NO in Step S22, and the processing returns to Step S15.

In the case of the photographing mode ending, it is determined as YES in Step S22, and the image capture processing ends.

Next, the detailed flow of storing processing will be explained while still referencing FIG. 7.

Storing processing is initiated on the event of a start operation for storing processing having been made on the input unit 18 by the user. It should be noted that, as a precondition, the priority setting table is stored in advance in the image capture apparatus 1. In the priority setting table, the priorities relating to each face image for discriminating the necessity of reception are set according to the user.

In Step S41, the communication unit 21 receives a transmission request for registration data. In other words, the second communication control unit 521 controls the communication unit 21 so as to receive a demand that demands for registration data to be transmitted.

In Step S42, the communication unit 21 receives registration data. In other words, the second communication control unit 521 controls the communication unit 21 so as to transmit registration data stored in the registration information storage unit 71 to an image capture apparatus having performed a transmission request for the registration data.

In Step S43, the CPU 11 enters standby for reception of data and storing.

In Step S44, the communication unit 21 receives a notification. In other words, the second communication control unit 521 controls the communication unit 21 so as to receive an image having low communication load serving as discrimination material and a notification transmitted therewith (notification to specified apparatus).

In Step S45, the priority determination unit 522 discriminates the reception necessity by the priority of registration data stored in the registration information storage unit 71.

In Step S46, the priority determination unit 522 discriminates whether reception is necessary from the priority discrimination results.

In the case of reception not being necessary, it is determined as NO in Step S46, and the processing returns to Step S44.

In the case of reception being necessary, it is determined as YES in Step S46, and the processing advances to Step S47.

In Step S47, the communication unit 21 transmits a captured image transmission request. In other words, the second communication control unit 521 controls the communication unit 21 so as to perform a demand to transmit a captured image that has been notified.

In Step S48, the communication unit 21 receives a photographed image in relation to the transmission request for the captured image. In other words, the second communication control unit 521 controls the communication unit 21 so as to receive the captured image.

In Step S49, the image correction unit 523 switches received image.

In Step S50, the image correction unit 523 determines whether the switched image is a moving image.

In the case of not being a moving image, it is determined as NO in Step S50, and the processing advances to Step S52. The processing of Steps S52 and higher will be described later.

In the case of being a moving image, it is determined as YES in Step S50, and the processing advances to Step S51.

In Step S51, the image correction unit 523 performs correction of image quality at a joining portion of respective moving images. In other words, the image correction unit 523 performs adjustment of the image quality to arrange the white balance, etc. so that a sense of incongruity in the joining images is not imparted.

In Step S52, the image storage unit 72 stores a received image. In other words, the storage control unit 524 controls the image storage unit 72 so as to store the received image.

In Step S53, the CPU 11 determines whether the photographing mode has ended.

In the case that the photographing mode has not ended, it is determined as NO in Step S53, and the processing returns to Step S44.

In the case that the photographing mode has ended, it is determined as YES in Step S53, and the storing processing ends.

The image capture apparatus 1A configured in the above way includes the second communication control unit 521, first communication control unit 511 and communication unit 21.

The second communication control unit 521 controls the communication unit 21 so as to transmit information of a face image serving as identification information to identify a specific subject to the other image capture apparatus 1B.

In addition, the first communication control unit 511 controls the communication unit 21 so as to receive from the other image capture apparatus 1B, among images captured by an image capture means (for example, image capture unit 17) included by each of the image capture apparatuses 1A and 1B, an image in which a subject designated in this transmitted face image is photographed.

This photographed image is thereby received in the image capture apparatus 1A from the image capture apparatus 1B, in the case of the subject corresponding to the received face image being photographed by the other image capture apparatus 1B.

Therefore, an image in which a specific subject targeted for acquisition is photographed can be acquired in the image capture apparatus 1A. In addition, with the image capture apparatus 1A, since the communication unit 21 included by the image capture apparatus 1A is employed to perform transmission and reception of images directly, an image can be acquired in real-time from the other image capture apparatus 1B, and it is possible to acquire the image of a more appropriate subject without requiring a separate server.

In addition, the first communication control unit 511 further controls the communication unit 21 so as to allow information of a face image serving as identification information transmitted from the other image capture apparatus 1B to be received.

The first communication control unit 511 controls the communication unit 21 so as to transmit, to the other image capture apparatus 1B, an image in which a subject designated by this received face image is photographed.

An image in which a subject corresponding to the received face image is photographed in the image capture apparatus 1A is thereby transmitted to the other image capture apparatus 1B.

Therefore, only an image in which a specific subject targeted for acquisition is photographed in the image capture apparatus 1A can be transmitted and received with a plurality of apparatuses including the own apparatus and the other image capture apparatus 1B. As a result thereof, with the image capture apparatus 1A, it is possible to acquire in real-time, and an image of a more appropriate subject can be acquired/supplied between a plurality of apparatuses without requiring a separate server.

In addition, when the own apparatus is in the photographing mode, in the case of the subject designated by a face image serving as the identification information of the subject having been photographed in the other image capture apparatus 1A, the first communication control unit 511 controls the communication unit 21 so as to receive this image from the other image capture apparatus 1B.

It is thereby possible to acquire in the image capture apparatus 1A an image in which a specific subject targeted for acquisition is photographed also from other image capture apparatus automatically, as if being photographed and acquired personally.

In addition, the identification information can be configured as a face image similar to the characteristic information of the subject used in image recognition.

The face image used in image recognition can thereby be used in the image capture apparatus 1A.

In addition, the identification information can be configured as information specifying characteristic information of the subject different from the characteristic information of the subject used in image recognition.

Characteristic information of a point of view different from the characteristic information of the subject used in image recognition can thereby be used as identification information in the image capture apparatus 1A.

The first communication control unit 511 determines the presence of reception according to whether the subject designated by the identification information is recognized within a photographed image.

It is thereby also possible to judge the presence of acquisition of an image during reception in the image capture apparatus 1A.

In addition, the first communication control unit 511 discriminates whether the subject designated by identification information has been recognized within a photographed image, according to the priority order of the subject being set. In other words, the priority determination unit 522, upon receiving a photographed image, discriminates the priority order from the image and discriminates the propriety of reception. Then, the first communication control unit 511 determines whether to receive the photographed image, in response to the discrimination result by the priority determination unit 522.

It is thereby possible to determine the propriety of reception in response to the priority order set according to the image, for example, in the case of being an image including a specific subject for which a high priority order is set, a determination such as reception is positively made to acquire a more suitable image of the subject.

In addition, the specified subject can be configured as a specific person.

An image in which a person is captured can thereby be acquired in the image capture apparatus 1A.

In addition, the photographed image and received image are moving images, still images or continuous shooting images.

The image capture apparatus 1A can thereby define various types of images such as moving images, still images or continuous shooting images as an acquisition target, and can acquire only a more appropriate image of the subject.

In addition, in the case of the received image being a moving image, the image capture apparatus 1A corrects a joining portion between moving images at the switching timing of a plurality of moving images.

In the case of receiving a plurality of moving images in the image capture apparatus 1, it is thereby possible to join each moving image to one moving image, and further perform correction to match the hue, etc. to one moving image in at least the connecting portion of each moving image, and unify the hues of both.

Therefore, the image capture apparatus 1 can reduce the sense of discomfort particularly at the joining portion, due to making a unified appearance in each moving image.

In addition, the image capture apparatus 1 includes the storage control unit 58.

The storage control unit 58 controls the storage unit 20 so as to store an image in which the subject designated by a face image serving as identification information is photographed in a received image.

Without requiring searching for images in which a specific subject targeted for acquisition is photographed from among a plurality of images, the image capture apparatus 1 can thereby store only a more appropriate captured image of a subject without requiring a compilation operation.

In addition, the storage control unit 58 controls the image storage unit 72 so as to not to store in a case of there not being an image in which the subject designated by a face image serving as identification information is photographed in the received image.

The image capture apparatus 1A thereby does not require a compilation operation for deleting unnecessary images since the storing of images is not done in the case of photographing with the own apparatus, for example, and when the photographed image is not an image in which a specific subject targeted for acquisition is photographed.

In addition, in the case of a subject designated by a face image as identification information is photographed in the own apparatus, the storage control unit 58 controls the storage unit 20 so as to store this image.

The image capture apparatus 1A can thereby store only a more appropriate image of a subject in which a specific subject targeted for acquisition is photographed, even for images acquired by photographing in the own apparatus.

In addition, the image capture apparatus 1A includes the first communication control unit 511 and second communication control unit 521.

The second communication control unit 521 controls the communication unit 21 so as to receive a face image as identification information of the subject designated by the other image capture apparatus 1B.

The first communication control unit 511 controls the communication unit 21 so as to transmit to the other image capture apparatus 1B, among images captured by an image capture means (for example, image capture unit 17) included by each of the image capture apparatuses 1A and 1B, an image in which a subject designated by this received face image is photographed.

The image capture apparatus 1A can thereby transmit only a more appropriate image of the subject in which a specific subject targeted for acquisition is photographed to the other image capture apparatus 1B in real-time, and can provide the image with requiring a separate server.

In addition, the communication system S is configured so as to mutually receive, between a plurality of apparatuses operated under the system, information of face images as identification information of the subject designated by the other image capture apparatus 1, including the own apparatus, and in the case of obtaining an image including the face image designed by each image capture apparatus 1, so as to transmit this image to a corresponding apparatus.

With the communication system S, it is thereby possible for each apparatus to acquire an image in which a specific subject targeted for acquisition is photographed. In addition, since the communication system S performs direct transmission and reception employing a communication means included in each apparatus, it is possible to acquire an image in real-time from another apparatus, and a more appropriate image of a subject can be acquired without requiring a separate server.

It should be noted that the present invention is not to be limited to the aforementioned embodiment, and that modifications, improvements, etc. within a scope that can achieve the object of the present invention are included in the present invention.

Although a face image that is characteristic information used in image recognition of a subject is transmitted as identification information specifying a subject in the aforementioned embodiment, so long as a shared plurality of face images is stored in advance in a plurality of image capture apparatuses, a person's name, etc. designating a person corresponding to the face image may be transmitted as identification information designating a subject in place of transmitting the face image.

In addition, although image capture processing is not mentioned in the case of there being a change in the presence of detection during transmission of captured images in the aforementioned embodiment, for example, in the case of a subject detected during captured image transmission no longer being detectable, it may be configured so as to stop transmission of the captured image at this moment.

In addition, it can be configured in the aforementioned embodiment so as to stop reception in the storing processing in a state in which there are no received images.

In addition, although processing for an image in which face detection was not possible is not mentioned in the aforementioned embodiment, for example, it can be configured so that an image for which face detection was not possible is discarded without performing storing. By configuring in this way, it is no longer necessary to store unnecessary images that are not targeted images, and a reduction in data volume and reducing the burden of compilation operation are possible.

In addition, although the determination of whether to transmit a photographed image is performed by the image capture apparatus on the receiving side in the aforementioned embodiment, it may be configured so as to be performed by the image capture apparatus on the transmitting side.

In addition, although configured so as to face detect a captured image, transmit the image to a corresponding apparatus, and then perform determination of storing of the image on the side of the apparatus having received the image in the aforementioned embodiment, it is not limited thereto It may be configured so as to perform determination of storing of an image in the processing of either one of the respective apparatuses doing the image capture processing and storing processing (including exchange with the own apparatus), for example, it may be configured so as to perform discrimination of a received image and determination of storing in a receiving apparatus, without performing face detection, etc. in the apparatus transmitting the image.

In addition, in the aforementioned embodiment, a digital camera has been described as an example of the image capture apparatus 1 to which the present invention is applied; however, the present invention is not particularly limited thereto.

For example, the present invention can be applied to any electronic device in general having the aforementioned image capture processing function or storing processing function. More specifically, for example, the present invention can be applied to a lap-top personal computer, a printer, a television, a video camera, a portable navigation device, a cell phone device, a smart phone, a portable gaming device, and the like.

The processing sequence described above can be executed by hardware, and can also be executed by software.

In other words, the hardware configuration shown in FIG. 4 is merely an illustrative example, and the present invention is not particularly limited thereto. In other words, the types of functional blocks employed to realize the above-described functions are not particularly limited to the example shown in FIG. 4, so long as the image capture apparatus 1 can be provided with the functions enabling the aforementioned processing sequence to be executed in its entirety.

In addition, a single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 3 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blue-ray Disc or the like. The magnetic optical disk is composed of an MD (Mini-Disk) or the like. The storage medium supplied to the user in a state incorporated in the device main body in advance may include, for example, the ROM 12 shown in FIG. 3, a hard disk included in the storage unit 20 shown in FIG. 3 or the like, in which the program is stored.

It should be noted that, in the present specification, the steps describing the program stored in the storage medium include not only the processing executed in a time series following this order, but also processing executed in parallel or individually, which is not necessarily executed in a time series.

In addition, in the present specification, the terminology of system indicates an entire apparatus configured from a plurality of devices, a plurality of means, etc.

Although some embodiments of the present invention have been explained above, the embodiments are merely exemplifications, and do not limit the technical scope of the present invention. Various other embodiments can be employed for the present invention, and various modifications such as omissions and replacements are possible without departing from the spirit of the present invention. Such embodiments and modifications thereof are included in the scope or spirit of the invention described in the present specification, and are included in the invention recited in the claims as well as the equivalent scope thereof.

While the present invention has been described with reference to the preferred embodiments, it is intended that the invention be not limited by any of the details of the description therein but includes all the embodiments which fall within the scope of the appended claims.

What is claimed is:

1. An image capture apparatus comprising:
a CPU which is operable as:
a transmission control section that transmits identification information for identifying a specific subject to one other apparatus; and
a reception control section that receives, from among images photographed by an image capture section included in the other apparatus, an image in which a subject designated by identification information transmitted by the transmission control section is photographed by the other apparatus having received the identification information, and is transmitted to an own apparatus address,
wherein the reception control section receives from the other apparatus an image transmitted, in a case in which the subject designated by the identification information transmitted by the transmission control section is photographed by the other apparatus and transmitted to the own apparatus address when the own apparatus is in a state capable of image capture.

2. The image capture apparatus according to claim 1, wherein the reception control section further receives identification information transmitted from the other apparatus, and
wherein the transmission control section transmits, to the one other apparatus having transmitted the identification information, an image in which a subject designated by the identification information received by the reception control section is photographed by way of an image capture section included in the own apparatus.

3. The image capture apparatus according to claim 1, wherein the identification information is a face image similar to characteristic information of a subject used in image designation.

4. The image capture apparatus according to claim 1, wherein the identification information is information specifying characteristic information of the subject differing from characteristic information of the subject used in image recognition.

5. The image capture apparatus according to claim 1, wherein the reception control section determines propriety of reception according to whether the subject designated by the identification information has been recognized within a captured image.

6. The image capture apparatus according to claim 5, wherein the reception control section determines whether the subject designated by the identification information has been recognized within a captured image, based on a priority order of a subject being set.

7. The image capture apparatus according to claim 1, wherein the specific subject is a specific person.

8. The image capture apparatus according to claim 1, wherein an image captured by the image capture section and an image received by the reception control section comprise one of a moving image, a still image, and a continuous shooting image.

9. The image capture apparatus according to claim 8, further comprising an image correction section that corrects a joining portion between moving images at a switching timing of a plurality of moving images, in a case of the image received being a moving image.

10. The image capture apparatus according to claim 1, wherein the CPU is further operable as a storing control section that controls storing of an image, wherein the storing control section controls a storing section so as to store an image received.

11. The image capture apparatus according to claim 1, wherein the CPU is further operable as a determination section that determines whether the image photographed satisfies a condition based on predetermined information different from the identification information, in case of the subject designated by identification information transmitted by the transmission control section being photographed by the other apparatus having received the identification information, and wherein the reception control section controls to receive the image photographed by the other apparatus from the other apparatus, in a case of the image photographed by the other apparatus being determined to satisfy the condition based on the predetermined information different from the identification information by the determination section, and controls not to receive the image photographed by the other apparatus from the other apparatus, in a case of the image photographed by the other apparatus being determined not to satisfy the condition based on the predetermined information different from the identification information by the determination section.

12. An image capture apparatus comprising:
a CPU which is operable as:
  a transmission control section that transmits identification information for identifying a specific subject to one other apparatus;
  a reception control section that receives, from among images photographed by an image capture section included in the other apparatus, an image in which a subject designated by identification information transmitted by the transmission control section is photographed by the other apparatus having received the identification information, and is transmitted to an own apparatus address; and
  a storing control section that controls storing of an image,
wherein the storing control section controls a storing section so as to store an image received, and
wherein the storing control section controls the storing section, in a case of an image in which the subject designated by the identification information is captured not being included among images received by the reception control section, so as not to store the image captured.

13. The image capture apparatus according to claim 12, wherein the storing control section controls the storing section, in a case of the subject designated by the identification information being captured in the own apparatus, so as to store the image captured.

14. A communication method executed by an image capture apparatus, the method comprising:
transmitting identification information that identifies a specific subject to one other apparatus; and
receiving, from among images captured by an image capture section included in the other apparatus, an image in which a subject designated by the identification information transmitted in the transmitting is captured by the other apparatus having received the identification information, and transmitted to an own apparatus address,
wherein the receiving receives from the other apparatus an image transmitted, in a case in which the subject designated by the identification information transmitted in the transmitting is photographed by the other apparatus and transmitted to the own apparatus address when the own apparatus is in a state capable of image capture.

* * * * *